United States Patent
Carter et al.

(10) Patent No.: US 9,467,375 B2
(45) Date of Patent: Oct. 11, 2016

(54) SERVICE MIGRATION

(71) Applicant: Metaswitch Networks Ltd, Enfield, Middlesex (GB)

(72) Inventors: Oliver James Carter, Middlesex (GB); Richard Hewitt, Middlesex (GB); Steve Welham, Middlesex (GB)

(73) Assignee: Metaswitch Networks, Ltd., Enfield (GB)

( * ) Notice: Subject to any disclaimer, the term of this patent is extended or adjusted under 35 U.S.C. 154(b) by 364 days.

(21) Appl. No.: 13/968,918

(22) Filed: Aug. 16, 2013

(65) Prior Publication Data
US 2014/0052875 A1    Feb. 20, 2014

(30) Foreign Application Priority Data
Aug. 16, 2012   (GB) .................................. 1214649.4

(51) Int. Cl.
*H04L 12/741*   (2013.01)
*H04L 29/14*    (2006.01)
*H04L 29/06*    (2006.01)
*H04L 29/12*    (2006.01)

(52) U.S. Cl.
CPC ........... *H04L 45/745* (2013.01); *H04L 61/103* (2013.01); *H04L 65/1073* (2013.01); *H04L 69/40* (2013.01); *H04L 61/6009* (2013.01)

(58) Field of Classification Search
CPC ... H04L 67/002; H04L 69/40; H04L 45/745; H04L 61/103; H04L 65/1073; H04L 61/6009
See application file for complete search history.

(56) References Cited

U.S. PATENT DOCUMENTS

| | | | |
|---|---|---|---|
| 2006/0107010 A1* | 5/2006 | Hirezaki ................. | G06F 3/061 711/165 |
| 2007/0061462 A1* | 3/2007 | Kim .................. | H04L 29/12066 709/226 |
| 2007/0061465 A1* | 3/2007 | Kim .................. | H04L 29/12066 709/226 |
| 2008/0162754 A1* | 7/2008 | Ogawa .................. | G06F 3/0613 710/74 |
| 2009/0198817 A1* | 8/2009 | Sundaram ......... | H04L 29/12301 709/227 |
| 2011/0072225 A1* | 3/2011 | Kawaguchi ........... | G06F 3/0605 711/162 |
| 2011/0264765 A1* | 10/2011 | Devadhar ............... | G06F 9/546 709/217 |
| 2013/0275568 A1* | 10/2013 | Nguyen .............. | H04L 41/5025 709/223 |

FOREIGN PATENT DOCUMENTS

WO       2010/111410 A2     9/2010
WO    WO 2010111410 A2 *   9/2010   ............. H04L 45/00

OTHER PUBLICATIONS

Wang, et al., Virtual Routers on the Move: Live Router Migration as a Network Management Primitive, SigCOMM08; Aug. 17-22, 2008. All pages.*

* cited by examiner

*Primary Examiner* — Uzuma Alam
(74) *Attorney, Agent, or Firm* — EIP US LLP

(57) ABSTRACT

At a migration server separate from a first server, a plurality of incoming internet protocol, IP, packets directed at an IP address associated with an IP service are received. On the basis of one or more source characteristics associated with IP packets in the plurality, it is determined that a first subset of packets in the plurality originated from one or more client devices which have not been migrated to a second server and that a second subset in the plurality originated from one or more client devices which have been migrated to the second server. IP packets determined to be in the first subset are forwarded to a first physical address associated with the first server for processing at the first server. IP packets determined to be in the second subset are processed at the second server.

18 Claims, 7 Drawing Sheets

SERVICE MIGRATION

CROSS REFERENCE TO RELATED APPLICATION

This application claims benefit under 35 U.S.C. §119(a) and 37 CFR 1.55 to UK patent application no. GB 1214649.4, filed on 16 Aug. 2012, the entire content of which is hereby incorporated by reference.

TECHNICAL FIELD

The present disclosure relates to service migration. In particular, but not exclusively, the present disclosure relates to measures for migration of an internet protocol (IP) service from a first server to a second server in an IP network.

BACKGROUND

It is common in IP-based networks to require replacing one IP-based server with another IP-based server. For the purposes of the present disclosure, an IP-based server (denoted 'IP server' hereinafter) is one which provides a service to users based on IP and transport layer protocols built on IP, for example the User Datagram Protocol (UDP), and the Transmission Control Protocol (TCP). Many such IP servers are complex with subtly different behavior for different clients—an example of one such server is a Session Border Controller (SBC), which handles connections from different Voice over Internet Protocol (VoIP) devices and retains subscriber state for potentially millions of client devices.

Replacing an IP server using a traditional "flash-cut" approach, where the old server is effectively turned off and a new server replaces it, is likely to cause disruption because many problems occur due to slightly different behavior of the old and new servers. Further, any such problems will occur at or around the same time, which further exacerbates the disruption and complicates mitigation attempts.

Another approach would be to configure each client device to contact a new server instead of the old server individually. However, such an approach is not practical with millions of client devices which are not likely to be under an administrator's control.

It would therefore be desirable to provide improved measures for migration of an IP service from server to server.

SUMMARY

In accordance with first embodiments, there is a method for use in migration of an internet protocol, IP, service from a first server to a second server in an IP network, the first server having a first physical address, the second server having a second physical address, the method comprising, at a migration server separate from the first server:
receiving a plurality of incoming IP packets directed at an IP address associated with the IP service;
determining, on the basis of one or more source characteristics associated with IP packets in the plurality, that a first subset of packets in the plurality originated from one or more client devices which have not been migrated to the second server and that a second subset in the plurality originated from one or more client devices which have been migrated to the second server; and
forwarding IP packets determined to be in the first subset to the first physical address associated with the first server for processing at the first server,
wherein IP packets determined to be in the second subset are processed at the second server.

In accordance with second embodiments, there is apparatus for use in migration of an internet protocol, IP, service from a first server to a second server in an IP network, the first server having a first physical address, the second server having a second physical address, the apparatus comprising a processing system configured to, at a migration server separate from the first server:
receive a plurality of incoming IP packets directed at an IP address associated with the IP service;
determine, on the basis of one or more source characteristics associated with IP packets in the plurality, that a first subset of packets in the plurality originated from one or more client devices which have not been migrated to the second server and that a second subset in the plurality originated from one or more client devices which have been migrated to the second server; and
forward IP packets determined to be in the first subset to the first physical address associated with the first server for processing at the first server,
wherein IP packets determined to be in the second subset are processed at the second server.

In accordance with third embodiments, there is a computer program product comprising a non-transitory computer-readable storage medium having computer readable instructions stored thereon, the computer readable instructions being executable by a computerized device to cause the computerized device to perform a method for use in migration of an internet protocol, IP, service from a first server to a second server in an IP network, the first server having a first physical address, the second server having a second physical address, the method comprising, at a migration server separate from the first server:
receiving a plurality of incoming IP packets directed at an IP address associated with the IP service;
determining, on the basis of one or more source characteristics associated with IP packets in the plurality, that a first subset of packets in the plurality originated from one or more client devices which have not been migrated to the second server and that a second subset in the plurality originated from one or more client devices which have been migrated to the second server; and
forwarding IP packets determined to be in the first subset to the first physical address associated with the first server for processing at the first server,
wherein IP packets determined to be in the second subset are processed at the second server.

In accordance with fourth embodiments, there is provided a system for use in migration of an internet protocol, IP, service from a first server to a second server in an IP network, the first server having a first physical address, the second server having a second physical address, the system comprising:
a migration server separate from the first server, the migration server comprising a processing system configured to:
receive a plurality of incoming IP packets directed at an IP address associated with the IP service;
determine, on the basis of one or more source characteristics associated with IP packets in the plurality, that a first subset of packets in the plurality originated from one or more client devices which have not been migrated to the second server and that a second subset in the plurality originated from one or more client devices which have been migrated to the second server; and forward IP packets determined to be in the first subset to the first physical address associated with the first server for processing at the first server, wherein IP packets determined to be in the second subset are processed at the second server; and a router device separate from the first server, the router device being adapted to:

prior to the receipt of the plurality of incoming IP packets, reconfigure replacement of a current mapping of the IP address to the first physical address with a further mapping of the IP address to a physical address associated with the migration server, whereby the plurality of incoming IP packets is received at the migration server.

Further features of embodiments will become apparent from the following description of preferred embodiments, given by way of example only, which is made with reference to the accompanying drawings.

DETAILED DESCRIPTION

Figure 1:
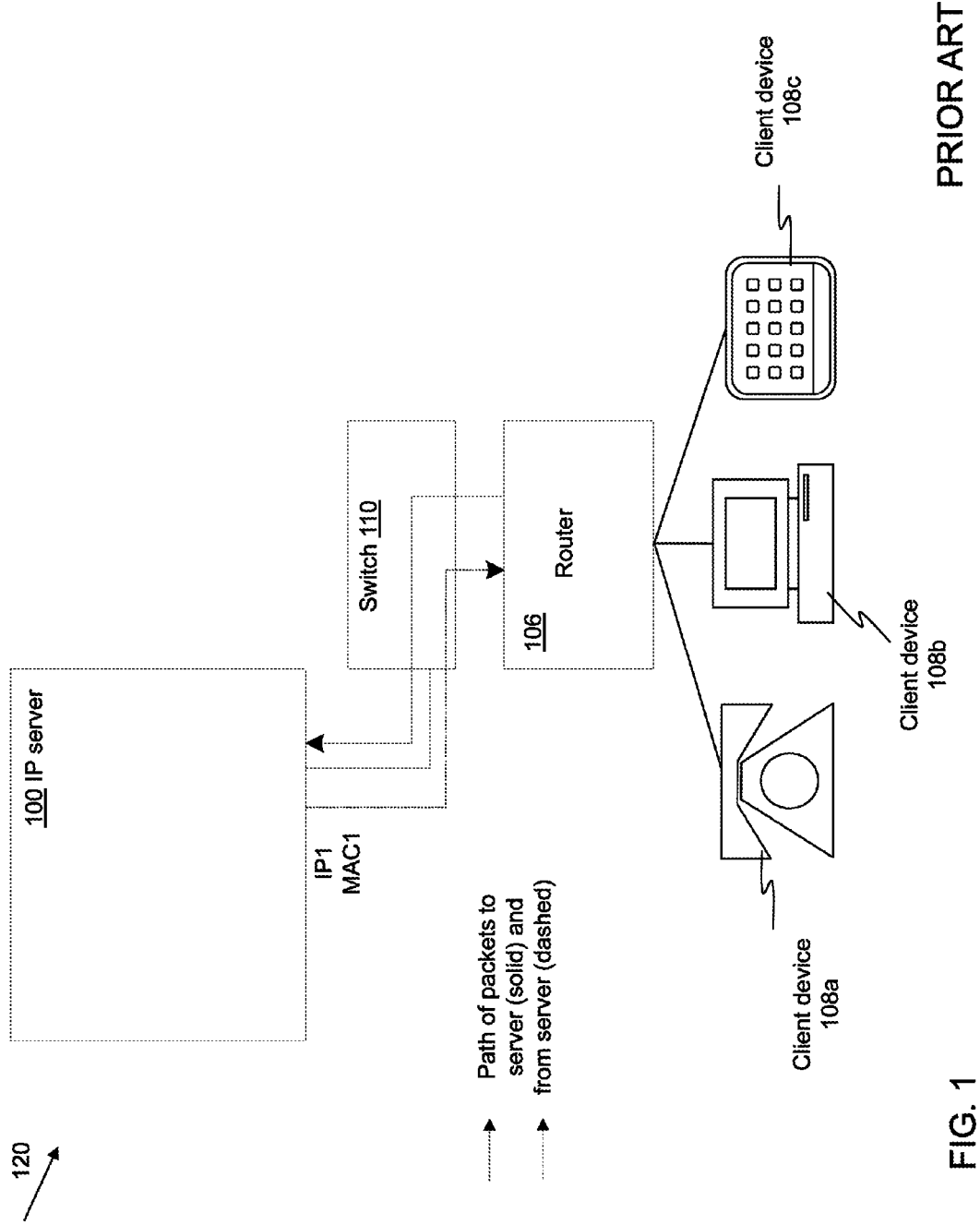
FIG. 1 shows a system diagram of an IP network according to the prior art.

FIG. 1 shows a system diagram of an IP network 120 according to the prior art. IP network 120 comprises an IP server 100 which serves (i.e. provides an IP service) to a number of client devices, with three example client devices 108a, 108b and 108c being depicted in FIG. 1. In practice, many more client devices could be present. The IP service is provided via a switch 110 and a router 106, the function of which is known in the art and will not be described herein. Router 106 is located upstream of IP server 100 towards client devices 108a, 108b, 108c.

Any of client devices 108a, 108b, 108c (or 'endpoint devices', or 'user equipment') may for example comprise a personal computer (PC), a mobile (or 'cellular') telephone (including a so-called "smart phone"), a VoIP telephone, a laptop, a tablet, a personal digital assistant (PDA), etc.

The IP service has an associated IP address, IP1, and incoming IP packets for the IP service are directed from client devices 108a, 108b, 108c towards IP1 via one or more other routers (not shown), network entities (not shown) and/or networks (not shown). Such incoming IP packets are received at router 106 which performs a lookup for IP1 in an address resolution protocol (ARP) table, resulting in a physical address, MAC1, for IP server 100 being obtained. Router 106 then directs the incoming IP packets to IP server 100 via switch 110 using the physical address MAC1. Upon receipt of the incoming IP packets, IP server 100 processes them accordingly, for example carrying out any data processing tasks requested and/or providing responses required by any of client devices 108a, 108b, 108c.

The path of IP packets to IP server 100 from router 106 is depicted in FIG. 1 as a solid line, whereas the path of IP packets from IP server 100 to router 106 is depicted as a dashed line.

The physical address (denoted MAC1 in FIG. 1), of IP server 100 is a physical identifier for a network interface or network interface card of IP server 100, as opposed to IP1 which is a network address for the IP service. The physical address can also be referred to as an Ethernet Hardware Address (EHA), hardware address, or burned-in address. A common example of such a physical address is a Media Access Control (MAC) address. IP server 100 may have more than one physical address, for example corresponding to further network interfaces or network interface cards; however, a single physical address is used herein for explanatory purposes.

Figure 2:
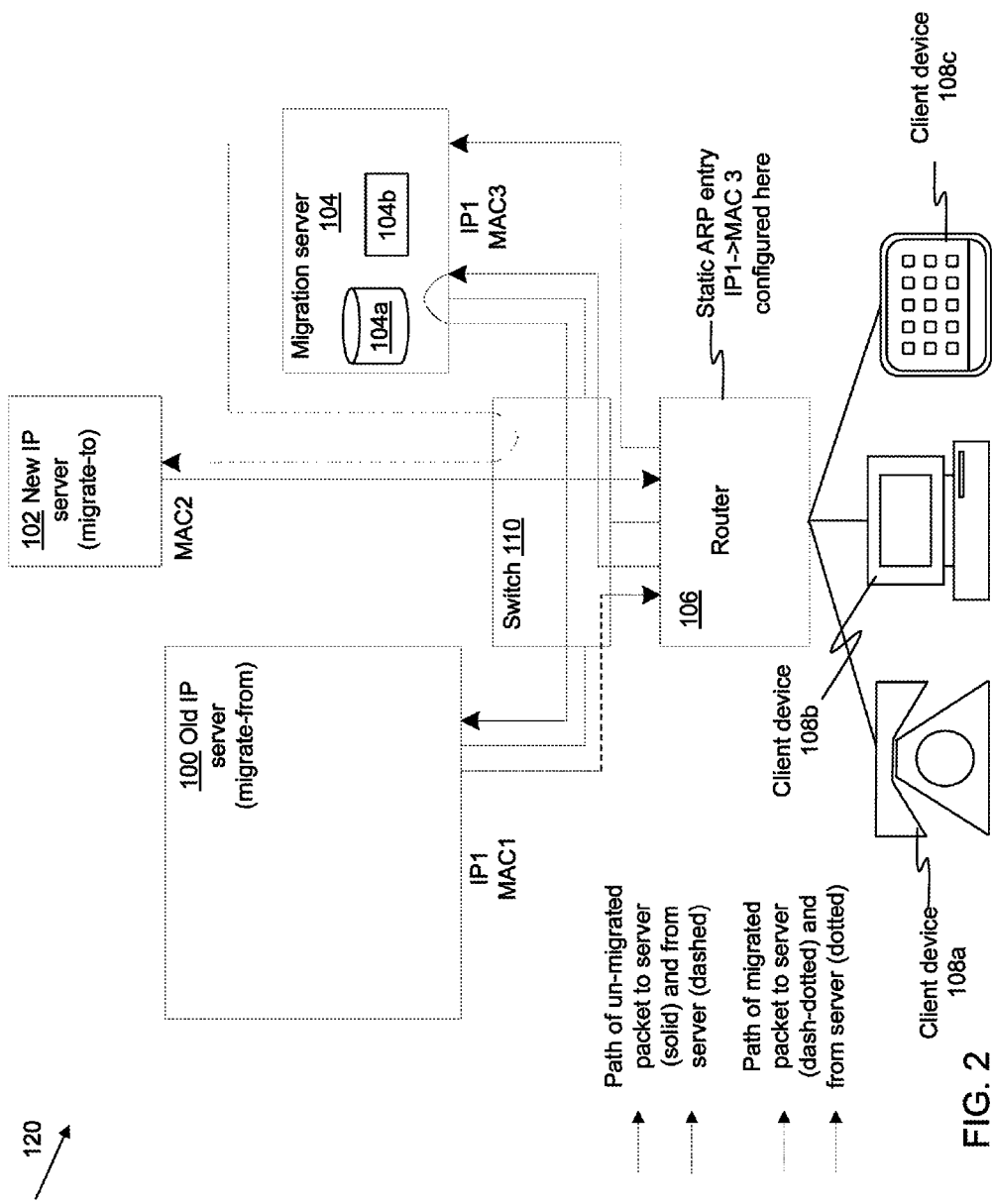
FIG. 2 shows a system diagram of an IP network according to embodiments.

FIG. 2 shows a system diagram of an IP network 120 according to embodiments. IP network 120 comprises an old IP server (or 'migrate-from' server) 100 and a new IP server (or 'migrate-to' server) 102. An IP service with an IP address of IP1 is currently provided by old IP server 100 as described above in relation to FIG. 1). The IP service currently provided by old IP server 100 is to be migrated over to new IP server 102 such that upon completion of the migration, the IP service will be provided by new IP server 102 instead of old IP server 100. Once migrated, the IP service will continue to have an IP address of IP1.

In embodiments, the old IP server comprises an SBC and the new IP server comprises an SBC such that an existing SBC is replaced with another SBC with similar function.

Embodiments of the present disclosure enable gradual migration of an IP service from one server to another so that any problems with a particular client device or group of client devices can be handled in a controlled manner, one-by-one (or group-by-group). Embodiments do not require any re-configuration of the client devices or the old IP server. The gradual migration can be carried out on a device-by-device basis (or 'peer-by-peer' basis) in order to localize/minimize any disruption the migration may cause.

An overview of gradual migration according to embodiments where the migration process is controlled by a migration server separate from the new server is given in the following paragraph:

The migration server is configured with the same IP address as the old server, but with a different physical address, for example a different MAC address. An upstream router is re-configured to map the server IP address to the migration server MAC address, for example using a static ARP table entry reconfiguration. The router will ignore broadcast messages (such as ARP messages) from the old server physical address indicating that it owns the IP address. On receipt of packets destined for the server IP address, the router sends the packets to the migration server physical address. The migration server incorporates a programmable packet switch function for implementing the migration process which in these embodiments is located separately from the new server. Initially, the migration server sends all packets straight to the old server. Then, based on comparing source IP address (and possibly other source properties/characteristics) of packets to configuration, the migration server forwards packets to the new server. Migration continues until all incoming packets are being handled by the new server, at which point the old server is removed and the static configuration on the upstream router is removed.

Embodiments enable migration without requiring any control or reconfiguration of the old server or peer/client devices. Further, in embodiments, neither the peer/client devices nor the old server are aware of any changes during or due to the migration.

The migration from old IP server 100 to new IP server 102 is managed by a migration server 104 which has a physical address of MAC3. In embodiments, migration server 104 comprises a migration server 104. Migration server 104 comprises (or has access to) a database 104a for storing data associated with the migration process and rules for operating such. Migration server 104 also comprises a processor or processing system 104b for carrying out data processing tasks.

To initiate the migration, router device 106, separate from old IP server 100, is reconfigured to replace a current mapping of the IP address IP1 associated with the IP service to the physical address MAC1 of old IP server 100 with a further mapping of the IP address IP1 to a physical address MAC3 associated with migration server 104. As a result of the reconfiguration, any packets subsequently directed to IP address IP1 will be transmitted by router 106 to physical address MAC3 and hence are received at migration server 104.

In embodiments, the reconfiguration comprises a reconfiguration of an entry in a static ARP table of router 106. Static configuration of ARP tables is a known feature of many Layer-3 (IP) routers, so detail of such configuration is not described herein.

Embodiments comprise measures, including methods, apparatus, computer software and computer program products, for use in migration of an IP service from old IP server 100 to new IP server 102 in IP network 120. Old IP server has a physical address of MAC1 and new IP server 102 has a physical address of MAC2.

A plurality of incoming IP packets directed at IP address IP1 associated with the IP service is received at migration server 104, which is a migration server separate from old IP server 100.

Migration server 104 determines, on the basis of one or more source characteristics associated with IP packets in the plurality, that a first subset of packets in the plurality originated from one or more client devices which have not been migrated to new IP server 102 and that a second subset in the plurality originated from one or more client devices which have been migrated to new IP server 102.

Migration server 104 forwards IP packets determined to be in the first subset to the physical address MAC1 associated with old IP server 100 for processing at old IP server 100.

IP packets determined to be in the second subset are processed at new IP server 102.

In the embodiments depicted in FIG. 2, migration server 104 is separate from old IP server 100 and the physical address MAC3 associated with migration server 104 comprises a physical address different from the physical address associated with new IP server 102. In such embodiments, migration server 104 forwards IP packets determined to be in the second subset to the physical address MAC 2 associated with new IP server 102; as a result of this forwarding, the processing of IP packets determined to be in the second subset is carried out by new IP server 102.

In embodiments, the path of packets originating from client devices which have been migrated to new IP server 102, i.e. those which are now served by new IP server 102, is different from the path of packets originating from client devices which have not been migrated to new IP server 102, i.e. those which are still served by old IP server 100. In FIG. 2, the path of IP packets to new IP server 102 from router 106 associated with migrated client devices is depicted as a dash-dotted line, whereas the path of IP packets from new IP server 102 to router 106 associated with migrated client devices is depicted as a dotted line. In FIG. 2, the path of IP packets to old IP server 100 from router 106 associated with non-migrated client devices is depicted as a solid line, whereas the path of IP packets from old IP server 100 to router 106 associated with non-migrated client devices is depicted as a dashed line.

In embodiments, migration server 104 stores, in database 104a, source characteristics associated with one or more client devices which have not been migrated to new IP server 102 and/or source characteristics associated with one or more client devices which have been migrated to new IP server 102. In such embodiments, migration server 104 carries out the determination with reference to the source characteristics stored in database 104a.

In embodiments, in response to completion of migration of a given client device to new IP server 102, migration server 104 updates the content of database 104a to indicate that migration of the given client device to new IP server 102 has been completed.

In embodiments, migration server 104 determines, on the basis of one or more source characteristics associated with IP packets in the plurality, that a third subset of packets in the plurality originated from one or more further client devices that are currently being migrated to new IP server 102. Migration server 104 analyses the IP packets determined to be in the third subset for a match to one or more predetermined trigger conditions.

In response to the analysis producing a match for a given IP packet in the third subset, the matched given IP packet is processed at new IP server 102. In embodiments, migration server 104 forwards the matched given IP packet to the physical address MAC2 associated with new IP server 102; as a result of the forwarding, the processing of the matched given IP packet is carried out by new IP server 102.

In response to the analysis producing no match for a given IP packet in the third subset, migration server 104 forwards the un-matched given IP packet to the physical address MAC1 associated with old IP server 100 for processing at old IP server 100.

Embodiments comprise migration server 104 storing, in database 104a, one or more source characteristics associated with the one or more further client devices, and in response to the analysis producing a match for a given IP packet in the third subset, migration server 104 updates database 104a to indicate that migration of the one or more further client devices to new IP server 102 has been completed.

In embodiments, the one or more predetermined trigger conditions comprise a time-out period by which migration of the one or more further client devices should be completed.

In embodiments, in response to the analysis producing a match for a given IP packet in the third subset, one or more other IP packets in the plurality which originated from one or more other client devices are processed at new IP server 102 and migration server 104 updates database 104a to indicate that migration of the one or more other client devices to new IP server 102 has been completed. In such embodiments, migration server 104 forwards the one or more other IP packets in the plurality to new IP server 102; as a result of the forwarding, the processing of the one or more other IP packets is carried out by new IP server 102. In embodiments, the client device which the given IP packet in the third subset originated from and the one or more other client devices are in the same source subnet. Such embodiments involve migrating multiple associated client devices when a trigger condition for one (or more) of such multiple client devices is met, for example migrating a whole subnet covering a plurality of client devices over to the new server in response to a trigger condition for one client device within the subnet being met.

Embodiments comprise, upon completion of migration from old IP server 100 to new IP server 102, further reconfiguring router device 106 to replace the further mapping of the IP address IP1 associated with the IP service to the physical address MAC3 associated with the migration server with a yet further mapping of IP address IP1 to the physical address MAC2 associated with new IP server 102. As a result of the further reconfiguration, any packets subsequently directed to IP1 of the IP service will be transmitted by router 106 to physical address MAC2 and hence are received and processed at new IP server 102. Note that the further reconfiguration need not comprise a static mapping. For example, once old IP Server 100 has been removed from the network (or its IP address changed) then the static mapping to physical address MAC3 can be removed and router 106 can revert to using dynamic ARP mechanisms.

In embodiments, the one or more source characteristics are associated with one or more of an IP address associated with a client device ('a source IP address'), a subnet, an IP address prefix length (for example defining a subnet), and a client device port.

Figure 3:
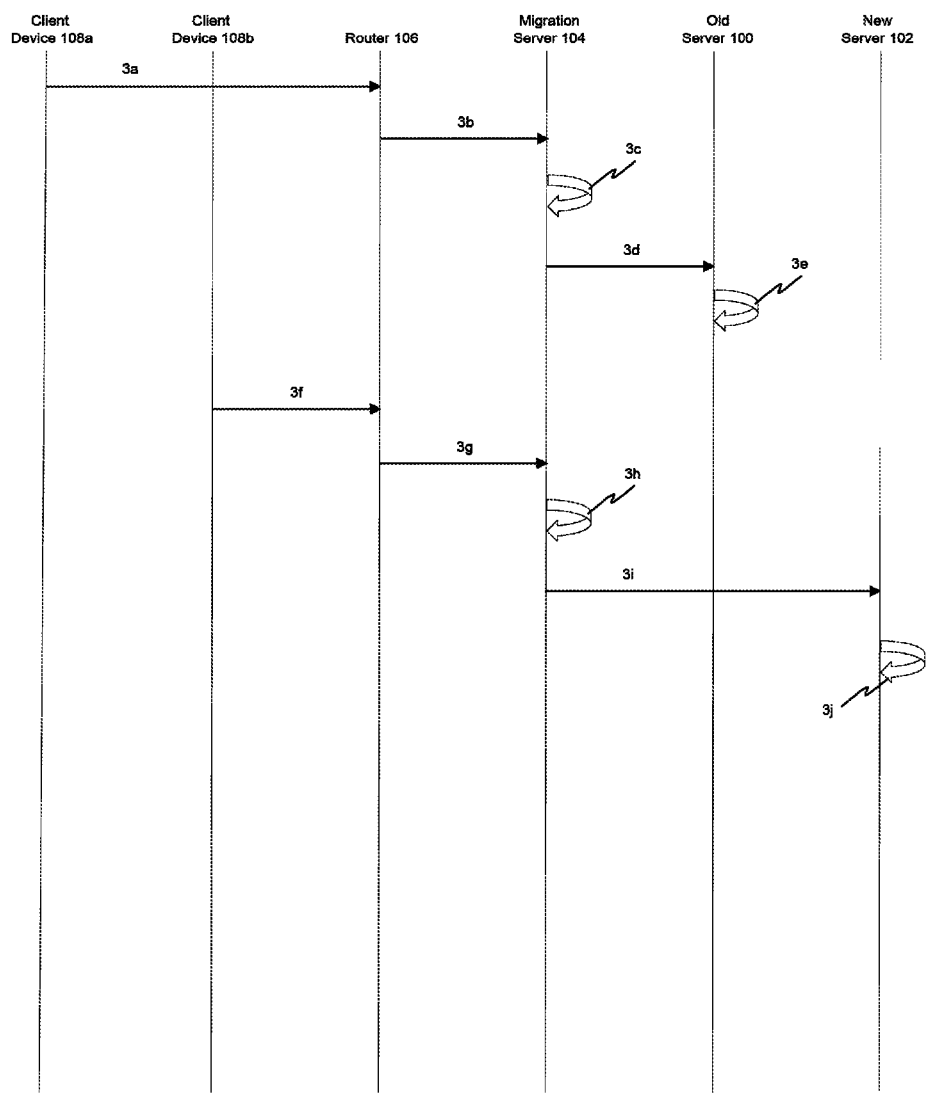
FIG. 3 shows a flow diagram according to embodiments.

FIG. 3 shows a flow diagram according to embodiments which can be implemented in the system shown in FIG. 2. In step 3*a*, a first incoming IP packet originating from client device 108*a* is directed towards IP address IP1 for an associated IP service in IP network 120. The first incoming IP packet arrives at router 106 according to packet routing processes known in the art which will not be described here in detail.

Router 106 has been configured with a mapping of IP address IP1 for the IP service to physical address MAC3 associated with migration server 104. As a result of this configuration, the first incoming packet originating from client device 108*a* is transmitted in step 3*b* from router 106 towards physical address MAC3 and hence received at migration server 104.

In step 3*c*, migration server 104, determines, on the basis of one or more source characteristics associated with the first incoming IP packet that the first packet originated from client device 108*a* which has not yet been migrated over to new IP server 102. In embodiments, migration server 104 examines the first data packet to identify one or more source characteristics associated with the first data packet, for example identifying a source IP address for client device 108*a* stored in an appropriate field of the first packet. In embodiments, the determination involves performing a lookup in database 104*a* for one or more source characteristics associated with the first packet and on the basis of the lookup determining that the first packet is comprised in a first subset of packets which originate from one or more client devices which have not been migrated to new IP server 102; in this case, migration server 104 determines that client device 108*a* has not yet been migrated over to new IP server 102.

In step 3*d*, migration server 104 forwards the first IP packet to physical address MAC 1 associated with old IP server 100 for processing by old IP server 100 in step 3*e*.

In step 3*f*, a second incoming IP packet, this time originating from client device 108*b*, is directed towards IP address IP1 for an associated IP service in IP network 120. The second incoming IP packet thus arrives at router 106.

Due to the configuration in router 106 of a mapping of IP address IP1 for the IP service to physical address MAC3 associated with migration server 104, the second incoming packet is transmitted in step 3*g* from router 106 towards physical address MAC3 and hence received at migration server 104.

In step 3*h*, migration server 104, determines, on the basis of one or more source characteristics associated with the second incoming IP packet that the second packet originated from client device 108*b* which has been migrated over to new IP server 102. In embodiments, migration server 104 examines the second data packet to identify one or more source characteristics associated with the second data packet, for example identifying a source IP address of client device 108*b* stored in an appropriate field of the second packet. In embodiments, the determination involves performing a lookup in database 104*a* for one or more source characteristics associated with the second packet and on the basis of the lookup determining that the second packet is comprised in a second subset of packets which originate from one or more client devices which have been migrated to new IP server 102; in this case, migration server 104 determines that client device 108*b* has been migrated over to new IP server 102.

In step 3*i*, migration server 104 forwards the second IP packet to physical address MAC 2 associated with new IP server 102 for processing by new IP server 102 in step 3*j*.

Figure 4:
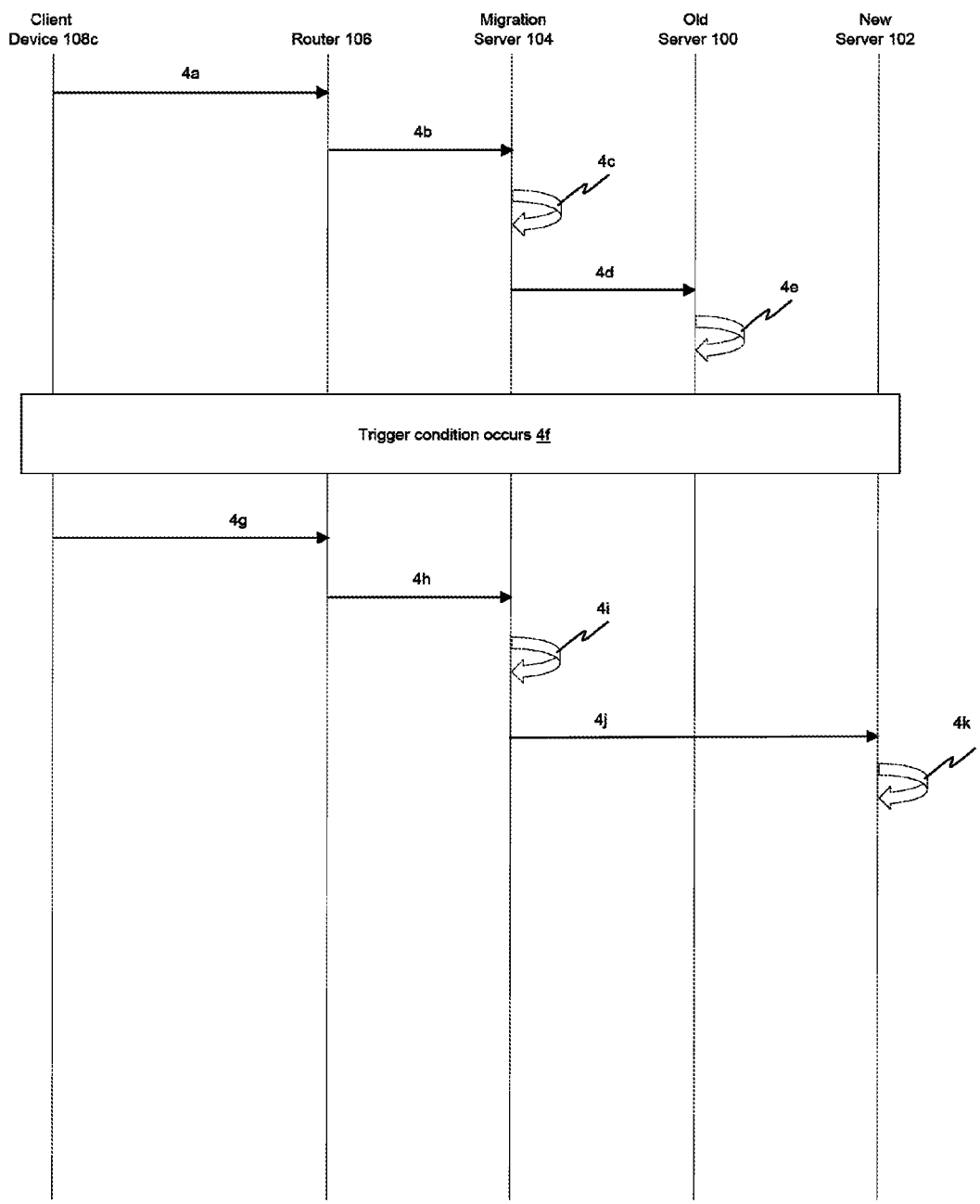
FIG. 4 shows a flow diagram according to embodiments.

FIG. 4 shows a flow diagram according to embodiments which can be implemented in the system shown in FIG. 2. In step 4*a*, a third incoming IP packet, originating from client device 108*c*, is directed towards IP address IP1 for an IP service in IP network 120. The third incoming IP packet thus arrives at router 106.

Due to the configuration in router 106 of a mapping of IP address IP1 for the IP service to physical address MAC3 associated with migration server 104, the third incoming packet is transmitted in step 4*b* from router 106 towards physical address MAC3 and hence received at migration server 104.

In step 4*c*, migration server 104, determines, on the basis of one or more source characteristics associated with the third incoming IP packet that the third packet originated from client device 108*c* which is currently in the process of being migrated over to new IP server 102. In embodiments, migration server 104 examines the third data packet to identify one or more source characteristics associated with the third data packet, for example identifying a source IP address of client device 108*c* stored in an appropriate field of the third packet. In embodiments, the determination involves performing a lookup in database 104*a* for one or more source characteristics associated with the third packet and on the basis of the lookup determining that the third packet is comprised in a third subset of packets which originate from one or more client devices which are currently being migrated to new IP server 102; in this case, migration server 104 determines that client device 108*c* is currently being migrated over to new IP server 102.

Migration server 104 analyses the third IP packet determined to be in the third subset for a match to one or more predetermined trigger conditions. In embodiments, the one or more predetermined trigger conditions are associated with client device 108*c*. In embodiments, the one or more predetermined trigger conditions are stored in database 104*a* and the analysis involves performing a lookup in database 104a to retrieve the one or more predetermined trigger conditions.

In this case, the analysis produces no match for the third data packet to the one or more predetermined trigger conditions. Since the one or more predetermined trigger conditions have not been met, migration server 104 determines that client device 108c is still in the process of being migrated over to new IP server 102 so that the third data packet should be processed by old IP server 100 rather than new IP server 102. Migration server 104 therefore forwards the third data packet to the physical address MAC1 associated with old IP server 100 in step 4d for processing by old IP server 100 in step 4e.

A predetermined trigger condition associated with client device 108c now occurs, as indicated by item 4f in FIG. 4. This predetermined trigger condition may for example involve a time-out of a migration period for client device 108c.

In step 4g, a fourth incoming IP packet, originating from client device 108c, is directed towards IP address IP1 for an IP service in IP network 120. The fourth incoming IP packet thus arrives at router 106.

Due to the configuration in router 106 of a mapping of IP address IP1 for the IP service to physical address MAC3 associated with migration server 104, the fourth incoming packet is transmitted in step 4h from router 106 towards physical address MAC3 and hence received at migration server 104.

In step 4i, migration server 104, determines, on the basis of one or more source characteristics associated with the fourth incoming IP packet that the fourth packet originated from client device 108c which is currently in the process of being migrated over to new IP server 102. In embodiments, migration server 104 examines the fourth data packet to identify one or more source characteristics associated with the fourth data packet, for example identifying a source IP address of client device 108c stored in an appropriate field of the fourth packet. In embodiments, the determination involves performing a lookup in database 104a for one or more source characteristics associated with the fourth packet and on the basis of the lookup determining that the fourth packet is comprised in a third subset of packets which originate from one or more client devices which are currently being migrated to new IP server 102; in this case, migration server 104 determines that client device 108c is currently being migrated over to new IP server 102.

Step 4i also involves migration server 104 analyzing the fourth IP packet determined to be in the third subset for a match to one or more predetermined trigger conditions.

In this case, since a predetermined trigger condition associated with client device 108c has occurred (as indicated by item 4f), the analysis results in a match for the fourth data packet to the one or more predetermined trigger conditions. Since the one or more predetermined trigger conditions have been met, migration server 104 determines that migration of client device 108c over to new IP server 102 has been completed so that the fourth data packet should be processed by new IP server 102 rather than old IP server 100. Migration server 104 therefore forwards the fourth data packet to the physical address MAC2 associated with new IP server 102 in step 4j for processing by new IP server 102 in step 4k.

Figure 5:
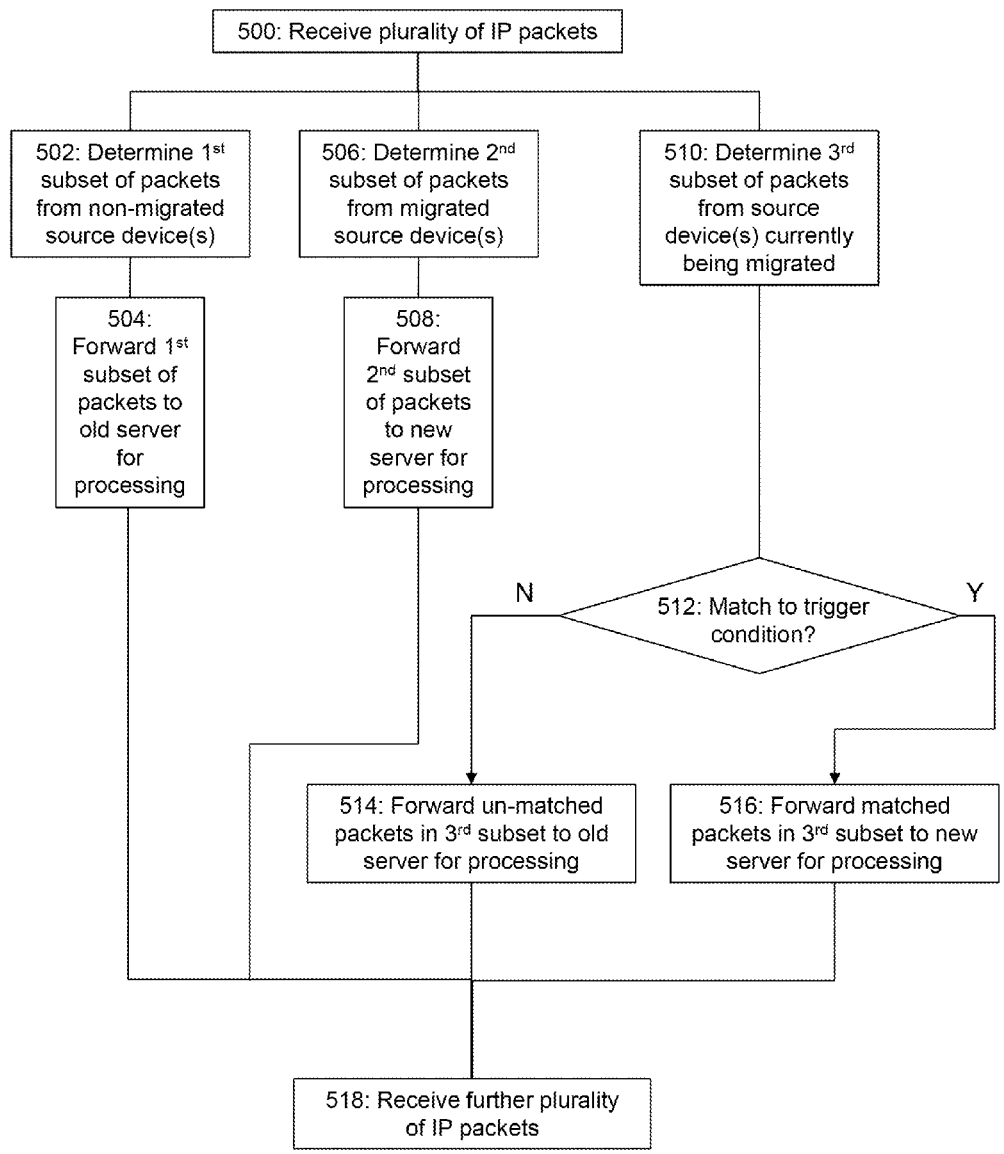
FIG. 5 shows a flow chart according to embodiments.

FIG. 5 shows a flow chart according to embodiments which can be implemented in the system shown in FIG. 2. FIG. 5 depicts processing by migration server 104 of a plurality of IP packets which is received at migration server 104, for example from router 106.

In item 500, a plurality of incoming IP packets is received at migration server 104.

In item 502, migration server 104 determines, on the basis of one or more source characteristics associated with IP packets in the plurality of received IP packets, that a first subset of packets in the plurality originated from one or more client devices which have not been migrated to new IP server 102. In some embodiments, the first subset of packets originate from client device 108a, but in other embodiments, the first subset of packets originate from a number of other client devices which have not been migrated over to new IP server 102. The process then proceeds on to item 504.

In item 504, migration server 104 forwards the IP packets determined to be in the first subset to the physical address MAC1 associated with old IP server 100 for processing at old IP server 100.

In item 506, migration server 104 determines, on the basis of one or more source characteristics associated with IP packets in the plurality of received IP packets, that a second subset of packets in the plurality originated from one or more client devices which have been migrated to new IP server 102. In some embodiments, the second subset of packets originate from client device 108b, but in other embodiments, the second subset of packets originate from a number of other client devices which have been migrated over to new IP server 102. The process then proceeds on to item 508.

In item 508, migration server 104 forwards the IP packets determined to be in the second subset to the physical address MAC2 associated with new IP server 102 for processing at new IP server 102.

In item 510, migration server 104 determines, on the basis of one or more source characteristics associated with IP packets in the plurality of received IP packets, that a third subset of packets in the plurality originated from one or more client devices which are currently being migrated to new IP server 102. In some embodiments, the third subset of packets originate from client device 108c, but in other embodiments, the third subset of packets originate from a number of other client devices which are currently being migrated over to new IP server 102. The process then proceeds on to item 512.

In item 512, migration server 104 analyses the IP packets determined to be in the third subset for a match to one or more predetermined trigger conditions. Such analysis may involve reference to one or more predetermined trigger conditions stored in database 104a.

If the analysis produces no match ('N' in FIG. 5) for a packet in the third subset, migration server 104 forwards in item 514 the un-matched IP packet to physical address MAC1 associated with old IP server 100 for processing at old IP server 100.

If the analysis does produces a match ('Y' in FIG. 5) for a packet in the third subset, migration server 104 forwards in item 516 the matched IP packet to physical address MAC2 associated with new IP server 102 for processing at new IP server 102.

Once item 504 and/or 508 and/or item 514 and/or item 516 have been carried out, the process proceeds on to item 518 where a further plurality of IP packets is received, whereupon further iteration(s) of items 500-516 may be carried out.

In embodiments described above, the migration server is implemented as a separate device (with separate physical address) from new IP server, for example a network device or element or suchlike. The new IP server therefore need not incorporate any of the packet switching function required for migration. In such embodiments, the packet path for migrated packets looks similar to that for un-migrated packets, but goes to a different device.

In embodiments described below, the migration server comprises part of the new IP server, for example a hardware module installed within or connected to the new IP server or software installed onto the new IP server.

An overview of gradual migration according to embodiments where the migration process is controlled by a migration server comprised within the new server is given in the following paragraph:

The new server is configured with the same IP address as the old server, but with a different physical address, for example a different MAC address. An upstream router is re-configured to map the server IP address to the new server MAC address, for example using a static ARP table entry reconfiguration. The router will ignore broadcast messages (such as ARP messages) from the old server physical address indicating that it owns the IP address. On receipt of packets destined for the server IP address, the router sends the packets to the new server physical address. The new server incorporates a programmable packet switch function for implementing the migration process which is referred to herein as a migration server which in these embodiments is comprised in the new server. Initially, the migration server sends all packets straight to the old server. Then, based on comparing source IP address (and possibly other source properties/characteristics) of packets to configuration, the migration server passes packets to the appropriate processing portion within the new server. Migration (through programming the migration server with rules by which the migration process should be carried out) continues until all incoming packets are being handled by the new server, at which point the old server is removed and the static configuration on the upstream router is removed.

Figure 6:
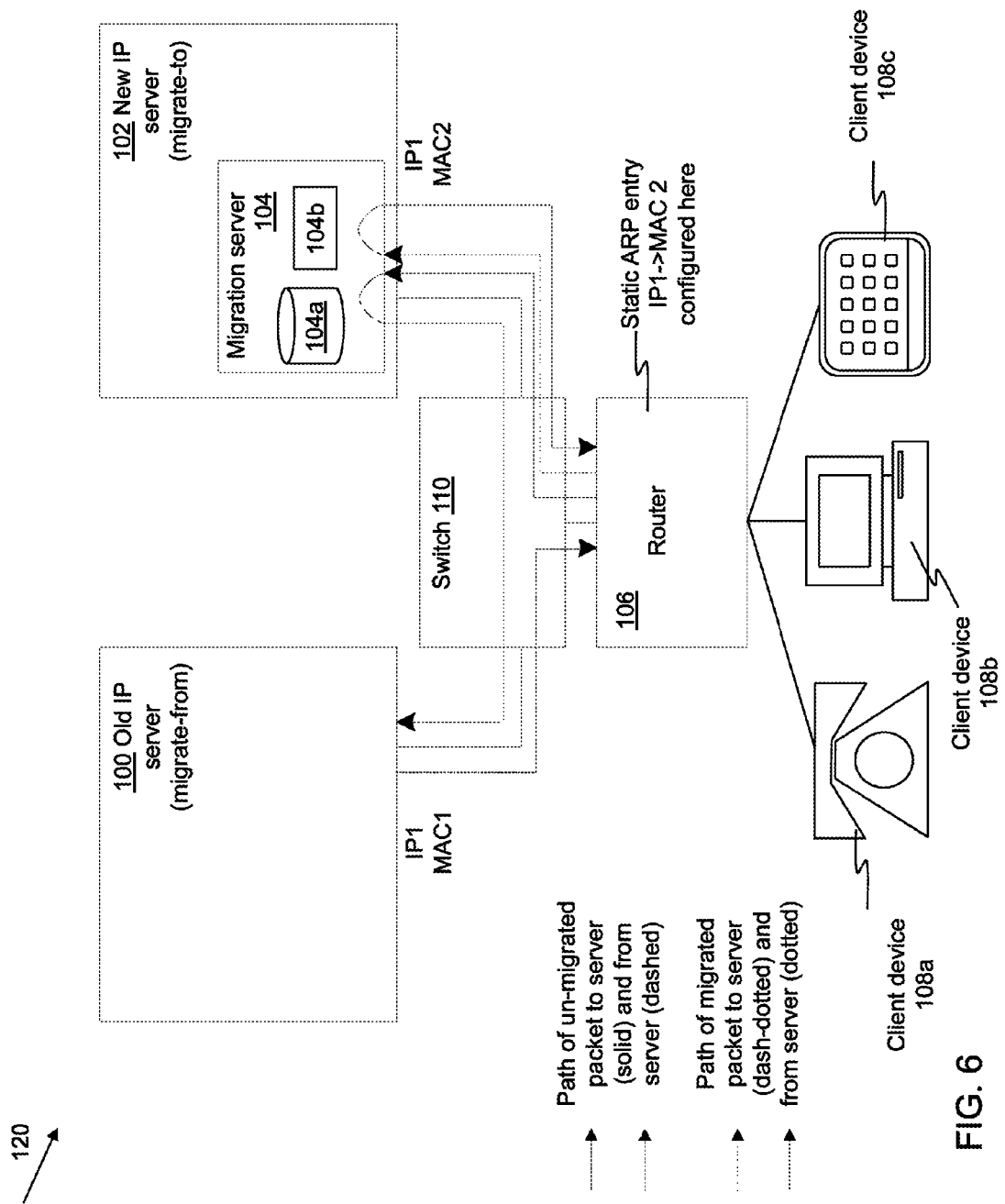
FIG. 6 shows a system diagram of an IP network according to embodiments.

FIG. 6 shows a system diagram of an IP network according to embodiments. FIG. 6 contains many similar elements to FIG. 2 which function in a similar manner. Here, however, instead of migration server 104 and new IP server 102 being located separately, migration server 104 is comprised in new IP server 102. The physical address associated with migration server 104 is therefore the same as the physical address associated with new IP server 102, i.e. MAC2.

In the embodiments of FIG. 6, to initiate the migration, router device 106, separate from old IP server 100, is reconfigured to replace a current mapping of the IP address IP1 associated with the IP service to the physical address MAC1 of old IP server 100 MAC1 with a further mapping of the IP address IP1 to a physical address MAC2 associated with migration server 104 and new IP server 102. As a result of the reconfiguration, any packets subsequently directed to IP1 will be transmitted by router 106 to physical address MAC2 and hence are received at migration server 104/new IP server 102.

In the embodiments of FIG. 6, when migration server 104 determines that an IP packet should be processed by new IP server 102, instead of having to forward the packet on to new IP server 102 via a further physical address associated with new IP server 102, migration server can just pass the IP packet to the relevant part/module/processor in new IP server 102 for processing accordingly.

Figure 7:
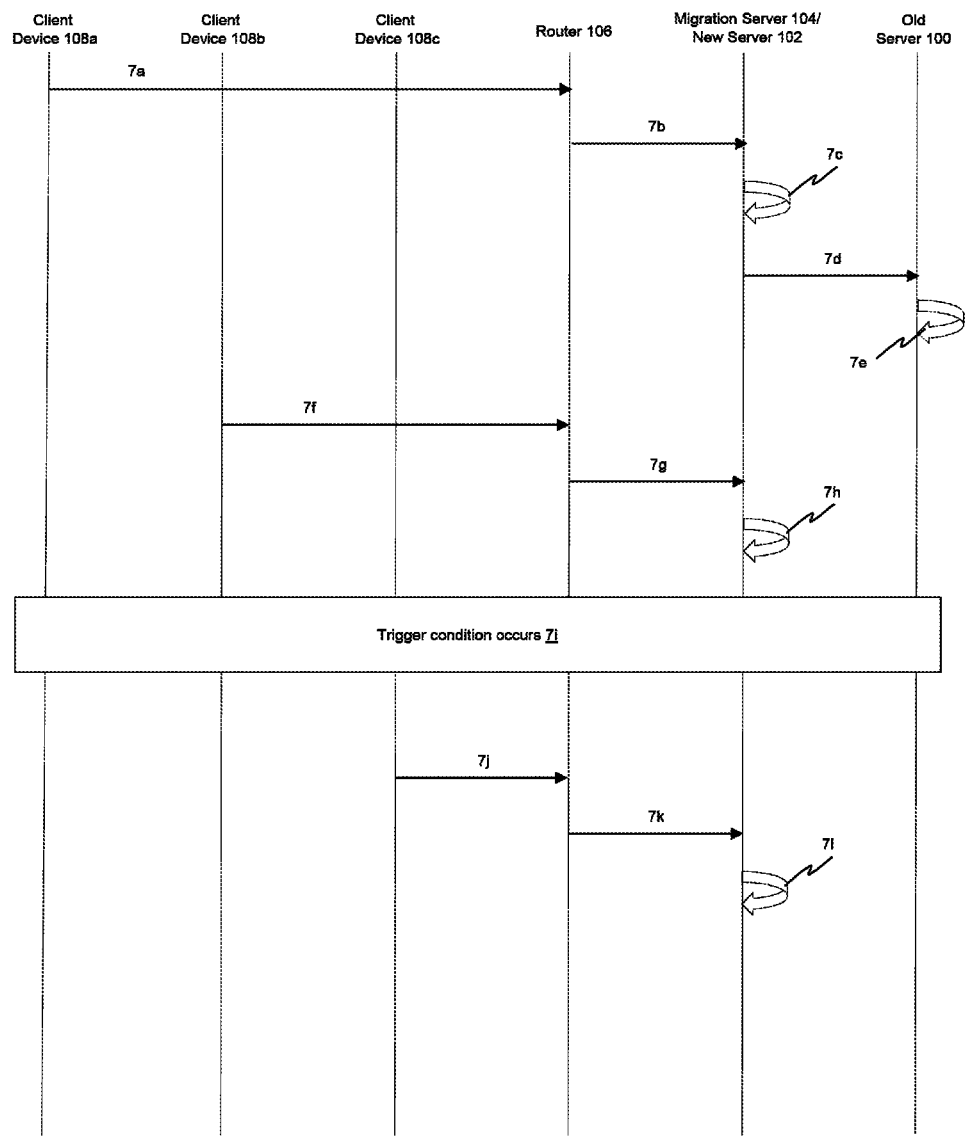
FIG. 7 shows a flow diagram according to embodiments.

FIG. 7 shows a flow diagram according to embodiments which can be implemented in the system shown in FIG. 6.

In step 7a, a first incoming IP packet originating from client device 108a is directed towards IP address IP1 for an associated IP service in IP network 120. The first incoming IP packet arrives at router 106 according to packet routing processes known in the art.

Router 106 has been configured with a mapping of IP address IP1 for the IP service to physical address MAC2 associated with migration server 104 and new IP server 102. As a result of the configuration, the first incoming packet originating from client device 108a is transmitted in step 7b from router 106 towards physical address MAC2 and hence received at migration server 104.

In step 7c, migration server 104, determines, on the basis of one or more source characteristics associated with the first incoming IP packet that the first packet originated from client device 108a which has not yet been migrated over to new IP server 102. In embodiments, migration server 104 examines the first data packet to identify one or more source characteristics associated with the first data packet, for example identifying a source IP address for client device 108a stored in an appropriate field of the first packet. In embodiments, the determination involves performing a lookup in database 104a for one or more source characteristics associated with the first packet and on the basis of the lookup determining that the first packet is comprised in a first subset of packets which originate from one or more client devices which have not been migrated to new IP server 102; in this case, migration server 104 determines that client device 108a has not yet been migrated over to new IP server 102.

In step 7d, migration server 104 forwards the first IP packet to physical address MAC 1 associated with old IP server 100 for processing by old IP server 100 in step 7e.

In step 7f, a second incoming IP packet, this time originating from client device 108b, is directed towards IP address IP1 for an associated IP service in IP network 120. The second incoming IP packet thus arrives at router 106.

Due to the configuration in router 106 of a mapping of IP address IP1 for the IP service to physical address MAC2 associated with migration server 104 and new IP server 102, the second incoming packet is transmitted in step 7g from router 106 towards physical address MAC2 and hence received at migration server 104.

In step 7h, migration server 104, determines, on the basis of one or more source characteristics associated with the second incoming IP packet that the second packet originated from client device 108b which has been migrated over to new IP server 102. In embodiments, migration server 104 examines the second data packet to identify one or more source characteristics associated with the second data packet, for example identifying a source IP address of client device 108b stored in an appropriate field of the second packet. In embodiments, the determination involves performing a lookup in database 104a for one or more source characteristics associated with the second packet and on the basis of the lookup determining that the second packet is comprised in a second subset of packets which originate from one or more client devices which have been migrated to new IP server 102; in this case, migration server 104 determines that client device 108b has been migrated over to new IP server 102.

Since in these embodiments, migration server 104 is comprised in new IP server, step 7h therefore also involves migration server 104 passing the second IP packet up to an appropriate portion of new IP server 102 for processing.

A predetermined trigger condition associated with client device 108c now occurs, as indicated by item 7i in FIG. 7.

This predetermined trigger condition may for example involve a time-out of a migration period for client device 108c.

In step 7j, a third incoming IP packet, originating from client device 108c, is directed towards IP address IP1 for an associated IP service in IP network 120. The third incoming IP packet thus arrives at router 106.

Due to the configuration in router 106 of a mapping of IP address IP1 for the IP service to physical address MAC2 associated with migration server 104 and new IP server, the third incoming packet is transmitted in step 7k from router 106 towards physical address MAC2 and hence received at migration server 104.

In step 7l, migration server 104, determines, on the basis of one or more source characteristics associated with the third incoming IP packet that the third packet originated from client device 108c which is currently in the process of being migrated over to new IP server 102. In embodiments, migration server 104 examines the third data packet to identify one or more source characteristics associated with the third data packet, for example identifying a source IP address of client device 108c stored in an appropriate field of the third packet. In embodiments, the determination involves performing a lookup in database 104a for one or more source characteristics associated with the third packet and on the basis of the lookup determining that the third packet is comprised in a third subset of packets which originate from one or more client devices which are currently being migrated to new IP server 102; in this case, migration server 104 determines that client device 108c is currently being migrated over to new IP server 102.

Step 7l also involves migration server 104 analyzing the third IP packet determined to be in the third subset for a match to one or more predetermined trigger conditions. In this case, since a predetermined trigger condition associated with client device 108c has occurred (as indicated by item 7i), the analysis results in a match for the third data packet to the one or more predetermined trigger conditions. Since the one or more predetermined trigger conditions have been met, migration server 104 determines that migration of client device 108c over to new IP server 102 has been completed so that the third data packet should be processed by new IP server 102 rather than old IP server 100.

Since in these embodiments, migration server 104 is comprised in new IP server, step 7l therefore also involves migration server 104 passing the third IP packet up to an appropriate portion of new IP server 102 for processing.

Embodiments relate to configuration of migration server 104 which controls the migration process. In embodiments, such configuration is stored in database 104a and retrieved and processed accordingly by processor 104b.

In embodiments, configuration of migration server 104 comprises configuration of one or more of the following parameters:

"migrate-ip"—the IP address of the service to migrate;
"migrate-from"—the MAC address of the server to migrate from (old IP server);
"migrate-to"—the MAC address of the server to migrate to (new IP server);
"migrate <src-IP> [subnet <subnet prefix length>] [port <src-port>] [trigger <trigger options> timeout <time after which to always migrate>]"—a command to configure migration of specific sources; and
"migrate complete"—a command to complete the migration and cause all packets to be handled by the new server. Using this without previously doing any migration of specific sources is equivalent to a "flash-cut" migration.

In embodiments, migration is carried out by identifying a plurality of migration objects which can be either single client devices or groups of two or more client devices such as a subnet.

In embodiments, each migration object is identified by one or more source characteristics, for example a source IP address or subnet (for example defined by an IP address prefix length).

In embodiments, each migration object is additionally identified by a source port such as a layer-4 port.

In some embodiments, each migration object has one or more associated predetermined trigger condition, for example with a time-out, which determines when migration occurs and/or when migration has been completed. In embodiments, as a default setting there is no trigger condition and a time-out of zero (so migration occurs immediately).

The migration server can provide various data for monitoring the progress of the migration process, for example displayed via a user interface of the migration server. The provided data may for example indicate currently migrating sources (client devices or groups thereof) and/or completed migrating sources. The provided data may for example indicate the number of packets passed to the migrate-from and/or migrate-to servers, with associated data rates which can be used for analyzing the proportion of traffic that has been migrated.

In embodiments, each migration object has an entry in an ordered table stored in database 104a. Incoming packets are matched (based on one or more source characteristics such as source IP address and/or source port) to the most specific migration object entry in the table.

In embodiments, the logic for processing a migration object upon receipt of a packet matching that migration object is as follows:

If the migration object exists in the ordered table (i.e. has been configured for migration):
    If the object has already completed migration, forward the packet to the migrate-to server (or pass up for local processing in embodiments where the migration-server is part of the migrate-to server).
    Else, analyze the packet for a match to one or more predetermined trigger conditions (typically involves Layer 4/Layer 5 parsing):
        If trigger time-out period has passed or a trigger condition is met, mark the migration object as completed migration and forward the packet to the migrate-to server;
        Else, forward the packet to the migrate-from server.
Else, forward the packet to the migrate-from server.

Note that in embodiments employing one or more predetermined trigger conditions and where several client devices are covered by one configuration (for example a configuration to migrate a whole subnet over to the new server), additional configuration of the migration server is required. In such embodiments, the additional configuration indicates whether meeting the one or more predetermined trigger conditions for a single client device (for example a client device associated with one IP address in a subnet) triggers switching for the entire configuration (for example all client devices having IP addresses in the subnet) or just that the single client device (and associated single IP address).

In embodiments, when the migration server forwards a packet to a new server which is remote from the migration server, the migration server leaves Layer-3 (IP) headers unchanged, and re-writes Layer-2 headers with the migration server physical address (for example MAC address) as the source of the packet and the target server physical address (for example MAC address) as the destination for the packet; such action is equivalent to the migration server acting as a router in relation to the packet.

The above description covers switching source client devices (or groups of source client devices) in a gradual (or 'step-by-step' fashion). Depending on the application, switching from an old IP server to a new IP server suddenly can cause disruption to one or more services being provided. For example where the server is an SBC, when a client device is involved in a VoIP phone call, it is highly likely that switching SBC during the call will cause disruption to that call. Therefore, in embodiments, the migration server can limit the risk of disruption to services provided to client devices by looking for specific predetermined trigger conditions before migrating a given client device or devices.

In a first such embodiment, the one or more predetermined trigger conditions comprise receipt of a new TCP connection request from the given client device or devices. The TCP packet monitored for may comprise a SYN flag. Such an embodiment involves processing at a Layer 4 level to help avoid disruption due to migration.

In a second such embodiment, the one or more predetermined trigger conditions comprise receipt of a SIP REGISTER message from the given client device or devices. Such an embodiment involves processing at a Layer 5 level to help avoid disruption due to migration.

In a third such embodiment, the one or more predetermined trigger conditions comprise receipt of an IP packet subsequent to receipt of a SIP BYE request or SIP 200 BYE response message from the given client device or devices. Such SIP BYE messages indicate that a phone call conducted via a client device has ended which in turn indicated an appropriate time for migration of that client device to be carried out. Such an embodiment involves processing at a Layer 5 level to help avoid disruption due to migration.

In embodiments where a predetermined trigger condition is configured, a time-out after which migration will occur regardless of whether the trigger condition has been met can be configured for a single client device or multiple or all client devices. Such a configured time-out helps to prevent migration being delayed unnecessarily due a predetermined trigger condition not occurring within an acceptable amount of time.

In embodiments, a limit on the number of migration objects which can be in a monitored state concurrently (i.e. currently being migrated) can be configured in order to avoid introducing an unacceptable delay by parsing too many incoming packets on the migration server at any one time or in a given period of time.

The above embodiments are to be understood as illustrative examples. Further embodiments are envisaged.

The embodiments described above relate to migration of an IP service between an old IP server and a new IP server. Embodiments can also apply to migration of a non-IP service between an old non-IP server and a new non-IP server.

The embodiments described above relate to migration of an IP service between a single old IP server and a single new IP server. Embodiments can also apply to migration from one server to multiple servers and from multiple servers to one server.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

What is claimed is:

1. A method for use in migration of an internet protocol, IP, service from a first server to a second server in an IP network, the method comprising:
   prior to receipt of a plurality of incoming IP packets, reconfiguring a router device separate from the first server, to replace a current mapping of a single IP address to a first physical address with a further mapping of the single IP address to a physical address associated with a migration server, whereby the plurality of incoming IP packets is received at the migration server, and wherein the migration server is separate from the first server;
   at the migration server separate from the first server, receiving the plurality of incoming IP packets directed at the single IP address associated with the IP service, wherein the first server has the first physical address and the second server has a second physical address, and wherein the physical address associated with the migration server comprises a third physical address different from the second physical address;
   at the migration server, determining, on the basis of one or more source characteristics associated with IP packets in the plurality, that a first subset of packets in the plurality originated from one or more client devices which have not been migrated to the second server and that a second subset in the plurality originated from one or more client devices which have been migrated to the second server; and
   in response to the determination, forwarding, at the migration server, IP packets determined to be in the first subset to the first physical address associated with the first server for processing at the first server; and
   in response to the determination, forwarding, at the migration server, IP packets determined to be in the second subset to the second physical address associated with the second server, for processing at the second server.

2. A method according to claim 1, wherein the reconfiguration comprises a reconfiguration of an entry in a static address resolution protocol, ARP, table.

3. A method according to claim 1, wherein the migration server is comprised in the second server and the physical address associated with the migration server comprises the second physical address.

4. A method according to claim 1, comprising storing, in a database, source characteristics associated with one or more client devices which have not been migrated to the second server and/or source characteristics associated with one or more client devices which have been migrated to the second server,
   wherein the determination is carried out with reference to the source characteristics stored in the database.

5. A method according to claim 4, comprising, in response to completion of migration of a given client device to the second server, updating the database to indicate that migration of the given client device has been completed.

6. A method according to claim 1, comprising:
   determining, on the basis of one or more source characteristics associated with IP packets in the plurality, that a third subset of packets in the plurality originated from one or more further client devices that are currently being migrated to the second server;

analyzing the IP packets determined to be in the third subset for a match to one or more predetermined trigger conditions;

in response to the analysis producing a match for a given IP packet in the third subset, processing the matched given IP packet at the second server; and in response to the analysis producing no match for a given IP packet in the third subset, forwarding the un-matched given IP packet to the first physical address associated with the first server for processing at the first server.

7. A method according to claim 6, comprising, forwarding the matched given IP packet to the second physical address associated with the second server, whereby the processing of the matched given IP packet is carried out by the second server.

8. A method according to claim 6, comprising: storing, in the database, one or more source characteristics associated with the one or more further client devices; and in response to the analysis producing a match for a given IP packet in the third subset, updating the database to indicate that migration of the one or more further client devices has been completed.

9. A method according to claim 6, wherein the one or more predetermined trigger conditions comprise a time-out period by which migration of the one or more further client devices should be completed.

10. A method according to claim 6, comprising, in response to the analysis producing a match for the given IP packet in the third subset, processing one or more other IP packets in the plurality which originated from one or more other client devices at the second server and updating the database to indicate that migration of the one or more other client devices to the second server has been completed.

11. A method according to claim 10, wherein the client device which the given IP packet in the third subset originated from and the one or more other client devices are in the same source subnet.

12. A method according to claim 6, wherein the one or more predetermined trigger conditions comprise one or more of:
receipt of a new transmission control protocol, TCP, connection request from at least one of the one or more further client devices,
receipt of a session initiation protocol, SIP, REGISTER message from at least one of the one or more further client devices,
receipt of an IP packet subsequent to receipt of a SIP BYE request or SIP 200 BYE response message from at least one of the one or more further client devices.

13. A method according to claim 1, comprising upon completion of migration from the first server to the second server, further reconfiguring the router device to replace the further mapping of the single IP address to the physical address associated with the migration server with a yet further mapping of the single IP address to the second physical address associated with the second server, whereby any subsequent incoming IP packets are received and processed at the second server.

14. A method according to claim 1, wherein the one or more source characteristics are associated with one or more of:
an IP address associated with a client device,
a subnet,
an IP address prefix length, and
a client device port.

15. Apparatus for use in migration of an internet protocol, IP, service from a first server to a second server in an IP network, the apparatus comprising a processing system, the processing system comprising at least one processor and at least one memory, the apparatus configured to:
prior to receipt of a plurality of incoming IP packets, reconfigure a router device separate from the first server, to replace a current mapping of a single IP address to a first physical address with a further mapping of the single IP address to a physical address associated with a migration server, whereby the plurality of incoming IP packets is received at the migration server, and wherein the migration server is separate from the first server;
at the migration server separate from the first server, receive the plurality of incoming IP packets directed at the single IP address associated with the IP service, wherein the first server has the first physical address and the second server has a second physical address, and wherein the physical address associated with the migration server comprises a third physical address different from the second physical address;
at the migration server, determine, on the basis of one or more source characteristics associated with IP packets in the plurality, that a first subset of packets in the plurality originated from one or more client devices which have not been migrated to the second server and that a second subset in the plurality originated from one or more client devices which have been migrated to the second server; and
in response to the determination, forward, at the migration server, IP packets determined to be in the first subset to the first physical address associated with the first server for processing at the first server; and
in response to the determination, forward, at the migration server, IP packets determined to be in the second subset to the second physical address associated with the second server, for processing at the second server.

16. Apparatus according to claim 15, wherein the apparatus comprises a session border controller, SBC.

17. A computer program product comprising a non-transitory computer-readable storage medium having computer readable instructions stored thereon, the computer readable instructions being executable by a computerized device to cause the computerized device to perform a method for use in migration of an internet protocol, IP, service from a first server to a second server in an IP network, the method comprising:
prior to receipt of a plurality of incoming IP packets, reconfiguring a router device separate from the first server, to replace a current mapping of a single IP address to a first physical address with a further mapping of the single IP address to a physical address associated with a migration server, whereby the plurality of incoming IP packets is received at the migration server, and wherein the migration server is separate from the first server;
at the migration server separate from the first server, receiving the plurality of incoming IP packets directed at the single IP address associated with the IP service, wherein the first server has the first physical address and the second server has a second physical address, and wherein the physical address associated with the migration server comprises a third physical address different from the second physical address;
at the migration server, determining, on the basis of one or more source characteristics associated with IP packets in the plurality, that a first subset of packets in the plurality originated from one or more client devices which have not been migrated to the second server and that a second subset in the plurality originated from one or more client devices which have been migrated to the second server; and in response to the determination, forwarding, at the migration server, IP packets determined to be in the first subset to the first physical address associated with the first server for processing at the first server; and in response to the determination, forwarding, at the migration server, IP packets determined to be in the second subset to the second physical address associated with the second server, for processing at the second server.

18. A system for use in migration of an internet protocol, IP, service from a first server to a second server in an IP network, the system comprising:

a migration server separate from the first server, the migration server comprising a processing system, the processing system comprising at least one processor and one memory, the migration server configured to:

at the migration server, receive a plurality of incoming IP packets directed at a single IP address associated with the IP service, wherein the first server has a first physical address and the second server has a second physical address, and wherein the physical address associated with the migration server comprises a third physical address different from the second physical address;

at the migration server, determine, on the basis of one or more source characteristics associated with IP packets in the plurality, that a first subset of packets in the plurality originated from one or more client devices which have not been migrated to the second server and that a second subset in the plurality originated from one or more client devices which have been migrated to the second server; and in response to the determination, forward, at the migration server, IP packets determined to be in the first subset to the first physical address associated with the first server for processing at the first server; and in response to the determination, forward, at the migration server, IP packets determined to be in the second subset to the second physical address associated with the second server, for processing at the second server; and a router device separate from the first server, the router device comprising at least one processor and one memory, the router device being configured to:

prior to the receipt of the plurality of incoming IP packets, reconfigure replacement of a current mapping of the single IP address to the first physical address with a further mapping of the single IP address to a physical address associated with the migration server, whereby the plurality of incoming IP packets is received at the migration server, and wherein the migration server is separate from the first server.

* * * * *